UNITED STATES PATENT OFFICE.

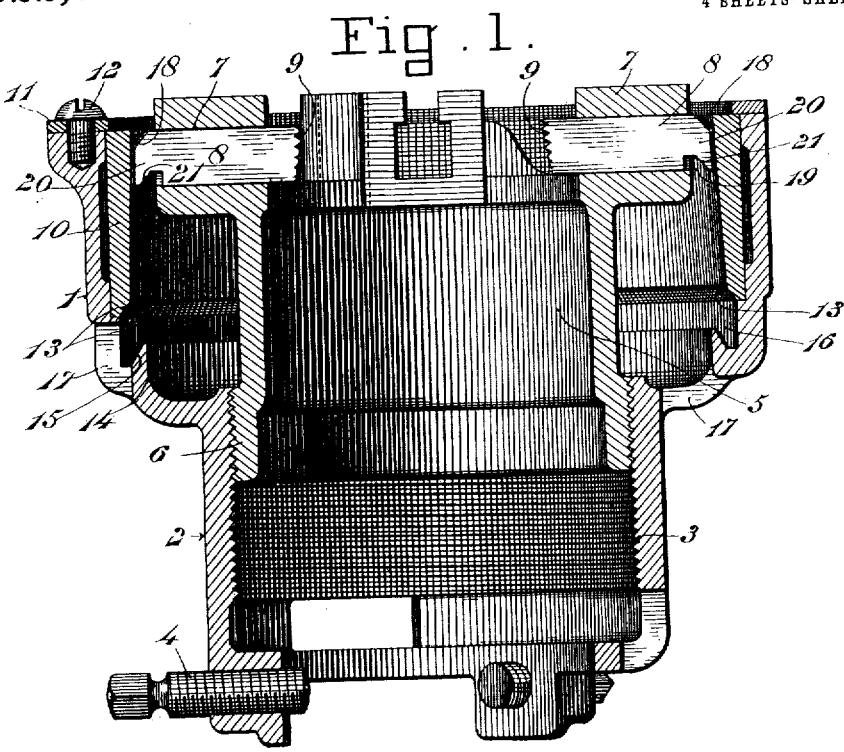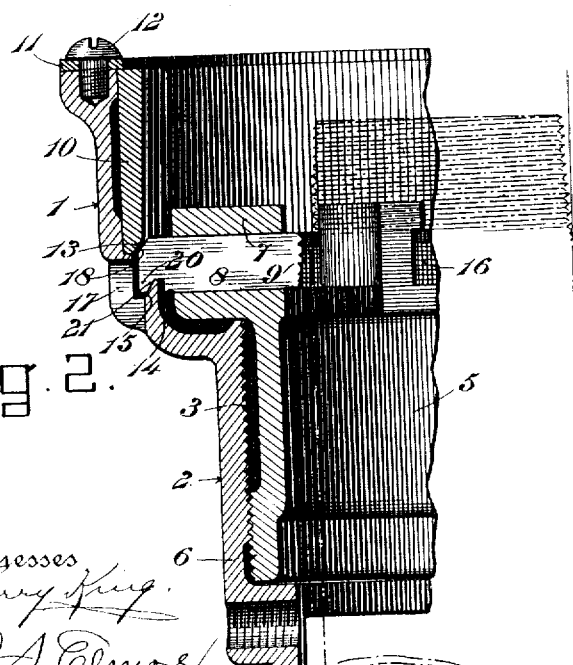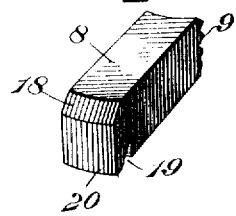

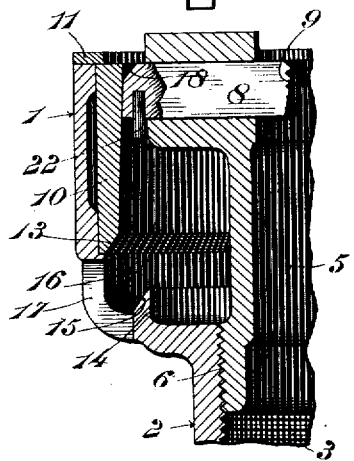
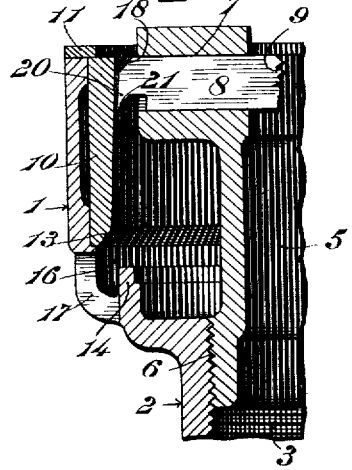
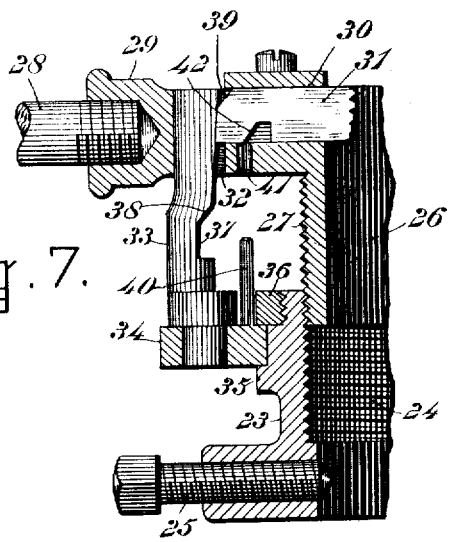
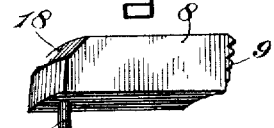
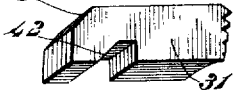

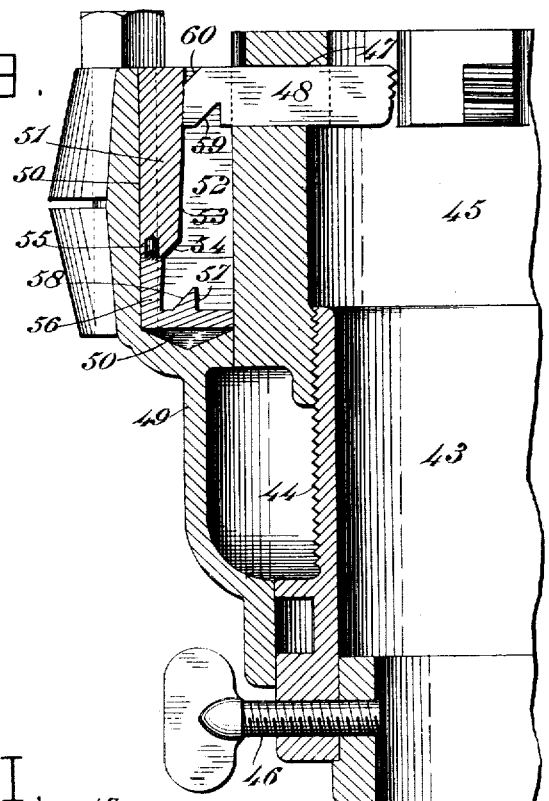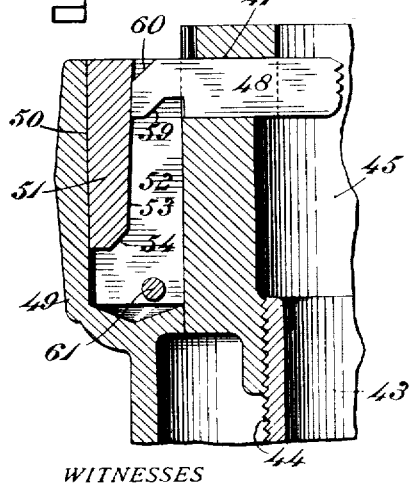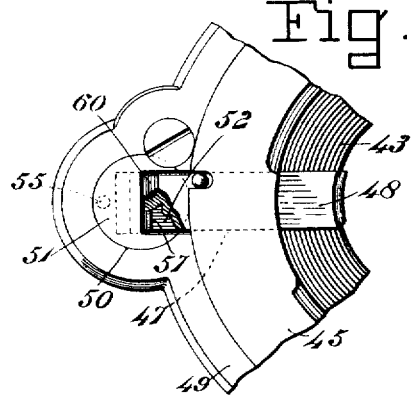

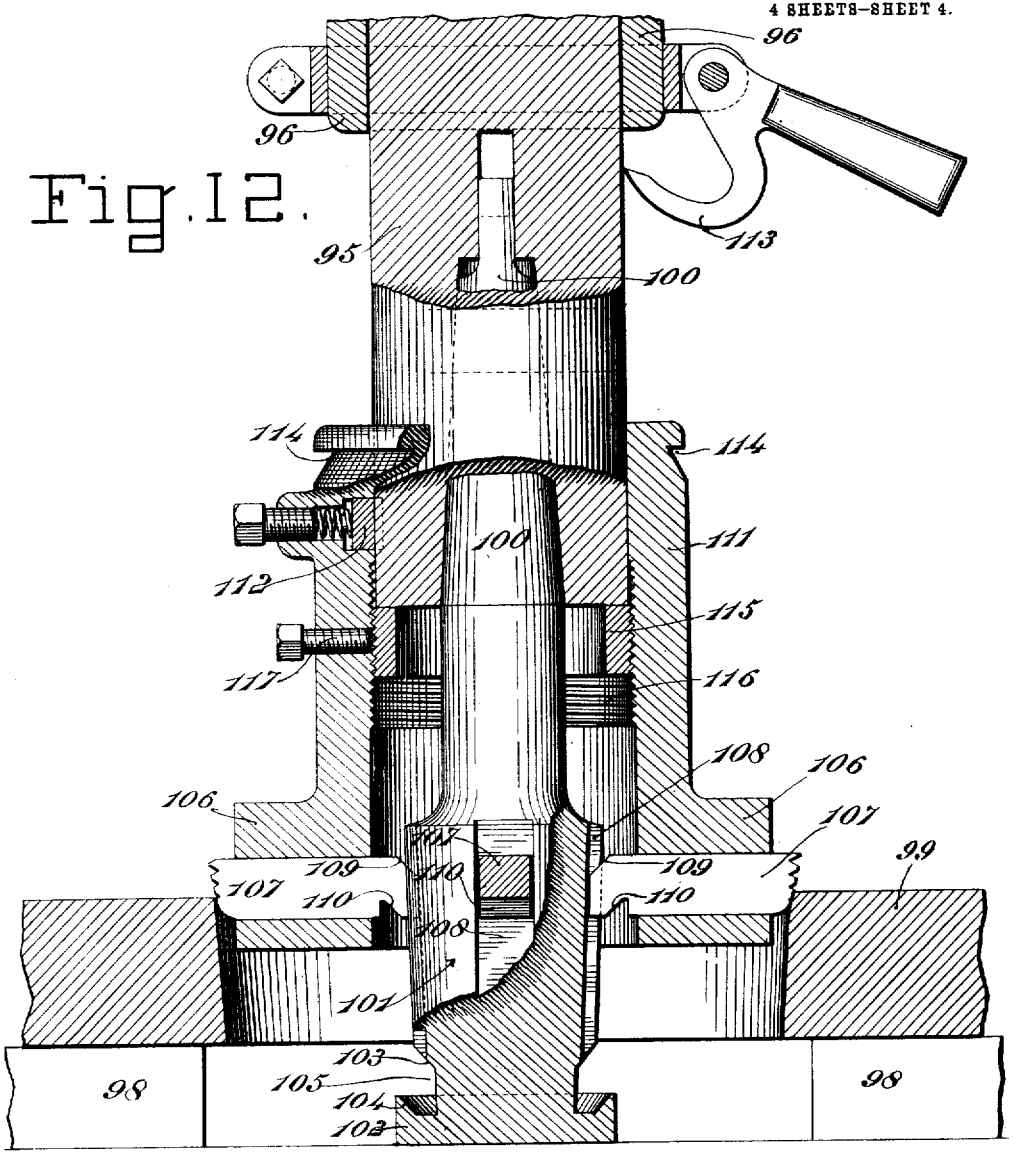

HILAND R. FARNSWORTH, OF SANDUSKY, OHIO, ASSIGNOR TO THE SANDUSKY FOUNDRY & MACHINE COMPANY, OF SANDUSKY, OHIO, A CORPORATION OF OHIO.

THREAD-CUTTING MACHINE.

1,022,934.     Specification of Letters Patent.     Patented Apr. 9, 1912.

Application filed December 5, 1907. Serial No. 405,276.

*To all whom it may concern:*

Be it known that I, HILAND R. FARNSWORTH, a citizen of the United States, residing at Sandusky, in the county of Erie and State of Ohio, have invented certain new and useful Improvements in Thread-Cutting Machines; and I do hereby declare the following to be a full, clear, and exact description of the invention, such as will enable others skilled in the art to which it appertains to make and use the same.

The object of this invention is to provide screw-threading and tapping machines with improved means for retracting the thread-cutting dies from the work, on completion of the operation, and for returning said dies to operative position when the die-carrying head is reversed or turned back to starting position. These well-understood functions are, by my present improvement, performed in a very simple way, and by utilizing only the essential elements already existing in the machines to which the invention is or may be applied.

In the accompanying drawings, which form a part of this specification, the invention is shown as applied to a number of machines of various types, to disclose the universality of its application, from which it will be clear that the range of adaptation of the invention is to be in no wise restricted to the particular machines illustrated in said drawings.

The invention will be first fully described by reference to said drawings and then more particularly pointed out in the claims following this description.

Figure 1 discloses a preferred embodiment of my invention, applied to the improved pipe-threading machine invented by Mr. A. L. Robbins, and disclosed in his Patent No. 887,741, dated May 12, 1908. This figure shows the machine in central vertical section, and representing the dies in operative or work-engaging position, and ready to start the operation. Fig. 2 is a similar fragmentary view of the same machine, with the die in retracted or work-releasing position. In this figure, the pipe which has been threaded is indicated by dotted lines. Fig. 3 is a perspective view of one of the dies. Fig. 4 is a fragmentary view similar to Fig. 1, illustrating another form or embodiment of my improvement. Fig. 5 is a perspective view of the die shown in Fig. 4. Fig. 6 is a view similar to Fig. 4, showing still another form or embodiment of my improvement. Fig. 7 is a fragmentary sectional view of a pipe-threading machine of the type shown in patent to Vosper No. 763,816 dated June 28, 1904, illustrating an application of my invention thereto. Fig. 8 is a perspective view of one of the dies used in this latter form of machine. Fig. 9 is a fragmentary sectional view of a pipe-threading machine of the type shown in patent to Cable No. 828,016 dated August 7, 1906, illustrating an application of my invention thereto. Fig. 10 is a top plan view, partly in section, of the same. Fig. 11 is a view similar to Fig. 9, showing a modified embodiment of the invention in the Cable type of machine. Fig. 12 is a central sectional view, partly in elevation, of a tapping machine showing an application thereto.

Referring first to Figs. 1, 2 and 3, in which my invention is shown applied to the Robbins pipe-threading machine, the symbol 1 denotes the hollow body or casing of said machine, constituting the stationary frame or work-holder thereof, in the neck of which the pipe, rod or other object to be threaded (called the work) can be centered and clamped by means of the set-screws 4. In the tubular part 2 of said work-holder, the internal lead-screw 3 is engaged by the tubular feed-screw 6 of the annular die-stock or die-carrying head 5; whereby, as the die-stock or head is revolved to carry out the thread-cutting-operation, which revolving may be effected in any appropriate manner, the die-stock or head is caused to advance axially within the casing or work-holder. It is understood of course that either the work or the dies may be revolved, the movement being relative, though in practice it is usual to revolve the die-carrying head. The radially-movable thread-cutting dies or chasers 8, slidably-fitted in guide-ways or slots 7 therefor in the head, and equipped if desired with the usual means for limiting their inward movements, are provided at their inner ends with the threading-bits 9, while their outer ends, or backs of the dies, which project beyond the perimeter of the die-head, contact with an abutment, consisting here of an interiorly tapered or conical sleeve or annulus 10, revolubly seated in the casing 1, being retained in position therein by a retaining-ring 11 which in turn is secured in place by screws 12 or other suitable fastenings. It may be noted that the backs of the dies are herein shown slightly rounded transversely, as seen more clearly in Fig. 3, so as to bear with a minimum amount of friction against the conical ring or tapered sleeve 10 which, it will be understood, revolves with the dies and is tracked or traversed longitudinally by the latter as the work advances, allowing a gradual receding of the dies as required to cut a tapered thread, as indicated in Fig. 2, according to the Robbins invention. As explained in said Robbins patent, the sleeve 10 is revolved with the dies either by the pressure of the latter against said sleeve, or by any suitable feather and groove connection between the sleeve and die head.

The foregoing parts, except as hereinafter noted, are or may be substantially similar in form and operation with the corresponding parts disclosed in the Robbins patent above mentioned; but it should be added that, for the purposes of my present invention, it is immaterial whether the abutment member 10 be tapered or cylindrical, or whether it revolve with the dies or not (though of course it is far preferable to have said member revolve with the dies), and, furthermore, said member may be dispensed with and the dies arranged to abut directly against the interior of the casing 1 in which event the latter would have a smooth interior surface, either cylindrical or tapered; it being expressly understood that the present showing and description of the Robbins machine is for the purpose of exemplifying one adaptation of my invention to a machine of that character. For the purpose of my invention, therefore, the conical abutment member 10, which is actually a separate element for the purpose of providing a revoluble conical abutment for the dies, may be considered as a part of the casing 1. The several modifications above suggested will be made apparent by reference to other figures of the drawings hereinafter.

So much for a brief exposition of the Robbins machine. I will now explain an application of my invention thereto.

In accordance with my invention, the inner or lower end of the sleeve 10 is inwardly beveled or chamfered at 13, while opposite or below the same an annular flange 14 in the casing 1 has its upper end outwardly beveled or chamfered at 15, the slant of the latter bevel 15 being preferably substantially parallel with that of the bevel 13. These two bevels or inclines or cam-surfaces 13 and 15 provide between them a space or recess 16, which (bearing in mind that the invention is being described with reference to the Robbins machine) is annular and extends wholly around the casing. Said annular space 16 is adapted to admit the backs of the dies 8 when retracted, as will appear later. Openings 17 cut at intervals in the casing 1 are merely to allow escape of chips or metal cuttings and reduce material. The backs or outer ends of the dies are beveled on their upper edges at 18, for coaction with the bevel 13 to return the dies after retraction; while the dies are also made or provided in some suitable manner, as by recessing their under faces transversely, as at 19, with projections 20 whose inner faces are beveled at 21 for coaction with the bevel 15 to retract the dies.

In operation, the pipe or other object to be threaded being clamped in the work-holder, and the die-carrying head starting at or about the position shown in Fig. 1, with the dies in operative or work-engaging position, the die-head in revolving is advanced axially, causing the dies to perform the thread-cutting operation in the usual way: in this instance the thread being cut on a taper (as indicated by the dotted line representations of the pipe in Fig. 2) by virtue of the conical interior surface of the member 10 against which the backs of the dies abut. As the die-head reaches the limit of its feed-movement, that is on completion of the thread-cutting operation, the bevels 21 on the under sides of the dies engage and ride upon the annular bevel 15, thereby automatically retracting the dies from the work, moving them to the position shown in Fig. 2, with the back portions of the dies seated in the annular recess 16. In this position, the bevels 18 on the upper sides of the dies may lie against or near the bevel 13 on the lower end of the sleeve 10. The dies having thus been retracted, as explained for releasing the work, the latter is removed from the work-holder, and the die-head is reversely-revolved to feed it to its initial position. At the beginning of this return movement of the die-stock, the bevel 13 coacting with the beveled faces 18 on the dies will automatically return them to their operative position; the dies as they move from the annular recess 16 being also carried upwardly by the reverse feed of the stock and thus brought in contact with the interior surface of the member 10 as before. The dies are thus automatically retracted and returned by each completion and reversal of feed of the die-stock or die-carrying head.

As will be seen, the improvement is installed or applied without importing any additional element or part into the machine, and consequently without appreciably increasing its cost. As the bevel 15 is a part of the case casting, it may be machined with the same tools and in the same operation used in boring out the casing. Obviously it costs no more for machining the sleeve 10 with the bevel 13 at the bottom than without the same. The triangular cross-cut 19 in the die is also a little inexpensive operation.

The invention is not confined to any specific form of bevels, as for example those shown in Figs. 1, 2 and 3, which as aforesaid represent only one preferred embodiment of the invention. In this connection, it should be noted that coacting bevels on both the die and casing are not essential; for a bevel on one of them and a coacting portion not beveled on the other would in some cases serve to effect the desired radial movement of the die. To illustrate these suggestions, reference will be made to Figs. 4, 5 and 6. In Figs. 4 and 5, instead of recessing or under-cutting the die, a pin or stud 22 is socketed in the under side of the die and depends therefrom in position to engage the bevel 15 for retracting the die. In Fig. 6, on the other hand, the die is made substantially the same as in Figs. 1 to 3, but the flange 14 in the case 1 is made with an angular edge instead of the bevel 15 shown in the other figures. Except as herein noted, the constructions represented in Figs. 4 and 6 respectively are or may be substantially the same as in Fig. 1, and the results are substantially the same.

Referring to Figs. 7 and 8, illustrating an application of my invention to the Vosper pipe-threading machine, as disclosed in Patent No. 763,816, the numeral 23 designates the tubular work-holder, provided with an internal lead-screw 24, and in which the work is centered and clamped by means of clamping screws 25, of which only one is shown. Arranged for movement longitudinally of the work-holder is the annular die-stock or head 26, provided with an external feed-thread 27 engaging the thread 24 for effecting the relative longitudinal movement of the die-stock and work-holder when one of said parts, preferably the die-head, is rotated relative to the other. This operation may be performed with laterally-projecting handles 28 removably fixed in socketed projections 29 on the die-head, only one of these handles being shown. The head is provided with a plurality of radial guides 30 to receive the dies or chasers 31. Back of each of these guides, and at right angles thereto, is an opening 32 which receives the upper end of a pin 33 constituting an abutment to receive the outer end thrust of the associated die, the pin being tapered to allow receding of the die for cutting a tapered thread. The lower ends of the several abutment pins 33 (only one being shown) are fixed in a ring 34 mounted for rotation on the work-holder 23 and held against movement longitudinally thereof by a flange or collar 35 at one side and a removable ring 36 at the other. The said ring 34, pins 33 and work-holder constitute a frame having thrust-sustaining surfaces or abutments. The foregoing is a brief description of the Vosper machine.

In applying my invention to this Vosper type of machine, the inner face or abutment surface of the pin 33, is provided at a suitable point with a recess 37, extending annularly with respect to the die-carrier to receive the outer end of the die when retracted, and formed to present an upwardly or forwardly inclined bevel or cam face 38, disposed to coöperate with the beveled or inclined face 39 of the die or chaser, for throwing the latter into active or work-engaging position; while carried by the ring 34 is a projection, preferably in the form of a pin 40, which, when the die-stock reaches the limit of its movement at the completion of the threading operation, passes through an opening 41 in the die-stock and acts upon an inclined or beveled face 42 on the bottom of the die for retracting the same to inactive or work-releasing position, as will be readily understood. Except for the slight changes in the parts above noted, for adaptation of my improved die-operating means to the Vosper machine, the construction and operation of said machine is or may be identical with that disclosed in the aforesaid Patent No. 763,816, and consequently further description thereof is deemed unnecessary.

In Figs. 9 and 10, the invention is shown applied to the Cable pipe-threading machine, in Patent No. 828,016. In said views, 43 is the tubular work-holder, externally threaded at 44 for engagement by the feed-screw formed on the rotary die-stock or head 45; there being provided, for securing the work in the holder, suitable clamping screws 46. The die-stock or head 45, which may be manually or otherwise rotated for causing it to feed longitudinally back and forth on the work-holder 43, is provided with radial guides or slots 47 to receive the dies or chasers 48; while surrounding the die-stock and work-holder, and adapted for rotation with the die-head, is a casing or frame member 49 in which is formed a plurality of longitudinal sockets 50, corresponding in number to, and respectively in alinement with, the outer ends of the slots 47. Arranged in each of the sockets 50 (of which only one is shown) is an abutment pin or block 51 having at its inner face, which is opposed to the back of the adjacent die 48, a groove or channel 52 annular with respect to the die-carrier made to receive the outer end of the die or chaser, and provided with an inclined face or wall 53 for guiding the die in cutting the tapered thread on the work.

In adapting my invention to this Cable machine, and as shown in Figs. 9 and 10, the abutment wall 53 of the pin 51 is beveled at its end to form an inclined cam face 54, while below the same, and fixed thereto by means of a dowel 55, is a supplemental piece 56, constituting a continuation of the pin, and suitably recessed to form an upwardly projecting portion or finger 57, having an inclined bevel or cam face 58, which coöperates with the correspondingly inclined cam face 59 on the die or chaser for retracting the latter to inactive or work-releasing position; a cam face 60 being formed on the die to coöperate with the cam face 54, for moving the die to active or work-engaging position. In the operation of this form of device, when the die-stock 45, which rotates in unison with the casing 49, reaches the limit of its feed movement, or that is at the completion of the thread forming operation, the bevel or cam face 58, through engagement with the bevel or cam face 59, retracts the die into the recess and out of engagement with the work, which may then be removed from the work-holder prior to returning the die-stock to its initial position; and, at the beginning of the reverse movement of the die-stock, the bevel 60 will ride on the bevel 54 for throwing the die to active or work-engaging position. Except in the formation of the guide-pin 51, and the outer end of the die or chaser, as explained, the construction and operation of the machine may be the same as disclosed in the aforesaid Cable patent.

In Fig. 11, illustrating a modification of Fig. 9, the guide-pin 51 is provided, in lieu of the beveled projection 57, with a pin 61 extended transversely through the guide-pin between the walls of the guide-channel 52, which is continued below the cam face 54; and in the operation of the device, the pin 61 acts as a cam for engagement with the bevel or cam-face 59 on the die or chaser 48, for throwing the latter to inactive or work-releasing position. In all other respects the construction and operation of Fig. 11 correspond to the description of Figs. 9 and 10.

Fig. 12, which represents an application of my invention to a tapping machine, may be briefly explained as follows: 95 denotes the vertical spindle of a standard or any well known type of drill-press, the power, feeding and adjusting mechanism of which is not shown. 96 is a stationary bearing for the drill-spindle. 97 is the bed or platen of the drill-press, and 98 are raised ribs or parallels thereon. 99 denotes an annular casting, such as a pipe-flange, which is to be tapped or interiorly threaded. This circular casting is of course properly centered and clamped upon the bed. In the nose of the drill-spindle, there is shown fitted the well known Morse tool-shank 100, which instead of being provided with a drill-bit carries in this case a cone 101. Said cone 101 has at its lower and smaller end a contracted or reduced extension terminating in a bottom flange 102. The lower end of the cone proper and the flange 102 are shaped to provide opposed bevels 103 and 104, between which is a recess 105. Surrounding the cone is an annular die-head 106, carrying in slots therein a series of radially movable tapping dies 107 for engaging and interiorly threading the hole in the casting 99; the threading bits of the dies being of course at their outer instead of their inner ends. The backs or in this case the inner ends of the dies abut against the cone 101 and engage in vertical grooves or channels 108 in the latter. Said backs of the dies are also made to fit within or adapted to enter the aforesaid recess 105, and are formed with the bevels 109 and 110 for coaction with the bevels 103 and 104 respectively. Said die-head has a tubular extension 111 which loosely encircles the nose of the drill-spindle. To prevent the die-head from falling off when the drill spindle is lifted up, a spring pressed plunger 112 in the tubular part or sleeve 111 bears frictionally against the side of the drill-spindle. Further, when the drill-spindle is raised, the die-holder may be retained by a hook 113 engaging in a notch-like groove 114 in the tubular part 111, said hook being attached by a clamp or otherwise to the bearing 96. The hook is shown released in the drawing, for the reason that Fig. 9 represents the mechanism lowered to operative position for engaging the work. Inside the tubular extension 111 of the die-head is a ring 115 constituting an abutment for the lower end or nose of the drill-spindle. This ring may be adjusted by screwing it in an internally threaded portion 116 of the sleeve 111, and secured by a set screw 117 the purpose of which will be explained later.

The operation is as follows: After the casting 99 to be tapped is fixed upon the bed or platen, then the drill-spindle is, by means of the adjusting or feeding mechanism of the drill-press, lowered to working position, carrying with it the cone 101 and the die-holder 106, the latter having been first released from the hook 113. The drill-spindle is lowered until the dies are brought down to the work, in position to proceed with the operation, as shown in Fig. 12; the nose of the drill-spindle abutting the ring 115 in the die-holder. The downward movement of the drill-spindle is now stopped, and power is applied to revolve the spindle, but without feeding it downward. As the spindle revolves, the die-head will also revolve, since the backs or inner ends of the dies are engaged by the channels 108 of the cone 101, the latter being of course revolved with the spindle. This revolving of the die-head will cause it to feed downward to carry out the tapping operation, the backs of the dies moving downward in the channels 108 and in contact with the cone 101, which allows the dies to recede gradually for making a tapered thread. If a straight thread is desired, the element 101 would of course be a cylinder. The feed of the dies is effected by their own screw-cutting action. As the dies reach the limit of their feed movement, the bevel 104 will engage and coact with the bevels 110 and thereby retract the dies. Thereupon the drill-spindle with the parts carried thereby can be raised to release the work and permit its removal from the machine; and another casting can be secured in place for tapping. The drill-spindle is then lowered as before to start the operation on the next casting, and as the die-holder assumes its initial relative position, the nose of the drill-spindle being brought again against the abutment 115, the bevel 103 will engage and coact with the bevels 109, and thus reset the dies. It is noted that the position of the ring 115 will determine the relative positions of the cone 101 and die-head at the beginning of the tapping operation. By the adjustment of said ring 115, as previously mentioned, the relative position of the cone may be so effected as to provide for tapping holes of larger or lesser diameter, without changing the dies, since the initial position of the cone relative to the dies will of course determine the size of the thread which is to be cut. Again, where using the tapered cone 101, the cone and die-holder may be locked together and fed downward in unison, and the cone may be utilized for adjusting the dies to vary the diameter of the thread which is cut, means being provided for bringing the bevels into coaction at the completion of the operation for retracting the dies from the work, on the principle explained. It is understood of course that the mechanism shown in this Fig. 12 is merely to exemplify one suitable application of my invention to a tapping machine.

In the following claims, the terms "retractable" and "backs of the dies", as well as other similar or related terms, are to be construed with reference to the particular type of machine to which the invention may be applied: it being apparent that the dies retract outwardly in the case of a pipe-threading or rod-threading machine, whereas they retract inwardly in the case of a tapping machine.

The term "revoluble" as applied to the die-stock will be understood as used in a relative sense, and as applying equally to a construction where the work is revolved in a stationary die-head. The term "radial" is not used restrictively but is intended to apply also where the dies may be disposed more or less obliquely to strictly radial lines.

It will be observed that in each of the illustrated embodiments of the invention there is a frame, which may consist of a single member having the work-holder at one end thereof, or of the work-holder and a member revolubly mounted thereon; said frame having a thrust-sustaining surface or surfaces which merge into an annular recess, or into recesses at intervals, adapted to receive the back of the die; said thrust-sustaining surface, whether it be stationary or revoluble, being in contact with the back of the die, which is adapted to be drawn into the recess for the purpose of removing the die from the work at the end of the cutting operation. The thrust-sustaining surface and recess are preferably continuous around the device, but whether continuous or interrupted at intervals, they have an annular relation to the die-carrier; hence the term "annular" as employed in the appended claims is to be understood as applying to either form.

Having thus described my invention what I claim as new and desire to obtain by Letters Patent is:

1. In a thread-cutting machine, the combination of a work-holder and a die-carrying head having a screw-connection, radially-movable dies carried by the head, means revolubly-mounted on the work-holder providing thrust-sustaining surfaces which revolve with and are traversed longitudinally by the backs of the dies as they advance axially, and automatic die-retracting and re-setting means operated respectively by the feed and reverse movements of the die-carrying head, the same comprising co-operative cam-instrumentalities of which a pair is on the die and another pair is carried by the work-holder and has a fixed longitudinal position, each pair of such instrumentalities including at least one beveled surface.

2. In a thread-cutting machine, the combination of a frame provided with an annular thrust-sustaining surface which merges into a recess having a cam-surface, and a die provided with means for engaging said cam-surface of said recess for the purpose of removing the die from the work at the end of the cutting operation.

3. In a thread-cutting machine, the combination of a frame provided with an annular thrust-sustaining surface which merges into an annular recess having cam faces, and a die provided with means for engaging a cam-faced portion of said recess for the purpose of removing the die from the work at the end of the cutting operation.

In testimony whereof I affix my signature, in presence of two witnesses.

HILAND R. FARNSWORTH.

Witnesses:
W. H. NULLGAUGH,
A. L. ROBBINS.